United States Patent [19]
Lehmann et al.

[11] 3,857,054
[45] Dec. 24, 1974

[54] DISCHARGE DEVICE AND METHOD FOR GENERATING NEAR INFRARED RADIATIONS

[75] Inventors: Willi Lehmann, Murrysville, Pa.; Anselm Wachtel, Parlin, N.J.

[73] Assignee: Westinghouse Electric Corporation, Pittsburgh, Pa.

[22] Filed: July 11, 1973

[21] Appl. No.: 378,286

[52] U.S. Cl............ 313/109, 250/504, 252/301.4 R
[51] Int. Cl.............................................. H01j 1/62
[58] Field of Search.............. 252/301.4 R; 313/109; 250/504

[56] References Cited
UNITED STATES PATENTS

| | | | |
|---|---|---|---|
| 2,059,640 | 11/1930 | Hood .................................. | 313/109 |
| 2,224,516 | 12/1940 | Kerstan ......................... | 252/301.4 R |
| 2,227,418 | 1/1941 | Addink ......................... | 252/301.4 R |
| 2,376,437 | 5/1945 | Leverenz...................... | 252/301.4 R |
| 2,523,026 | 9/1950 | Jones ........................... | 252/301.4 R |
| 2,901,436 | 8/1959 | Klasens........................ | 252/301.4 R |
| 3,723,339 | 3/1973 | Wanmaker et al........... | 252/301.4 R |

OTHER PUBLICATIONS

"An Alumina-Lithia-Iron Oxide Phosphor," by Jones Journal Electrochemical Society, Vol. 95, No. 6, June 1948, pp. 295–297

*Primary Examiner*—Harold A. Dixon
*Attorney, Agent, or Firm*—W. D. Palmer

[57] ABSTRACT

To generate near infrared radiations while minimizing the presence of visible radiations, there is irradiated with short wavelength ultraviolet radiations a phosphor consisting essentially of an $LiAlO_2$ matrix activated by from 0.001 to 0.02 gram atom of iron per gram mole of matrix. Preferably the phosphor is incorporated as a coating for an otherwise conventional fluorescent lamp. For best output the phosphor is initially prepared in accordance with conventional techniques by solid-state reaction of the phosphor constituents. Thereafter, the phosphor is fluxed by mixing lithium carbonate therewith, with the gram atoms of lithium in the added carbonate being from 1 to 15 percent of the gram atoms of lithium in the matrix of the mixed phosphor. This mixture is then fired, which increases the output of the phosphor and also its particle size, and residual flux is then removed by leaching in a dilute acidic solution. To insure that all residual unreacted flux is removed, a small amount of aluminum oxide, or aluminum compound which will convert to the oxide on firing, is added to the fluxed material and the mixture refired.

8 Claims, 3 Drawing Figures

DISCHARGE DEVICE AND METHOD FOR GENERATING NEAR INFRARED RADIATIONS

BACKGROUND OF THE INVENTION

This invention generally relates to the generation of near infrared radiations while minimizing the presence of visible radiations and, more particularly, to a method and discharge device for generating such radiations.

Efficient infrared emitting phosphors or fluorescent materials are relatively rare. Those infrared emitting materials which are known, such as copper-activated cadmium sulfide and copper-activated zinc-mercuric sulfide normally absorb visible radiations and also are excited by visible radiations. Pursuant to the usual term of the art, these phosphors can be categorized as having a narrow band gap and such phosphors are normally rapidly decomposed by the short wavelength ultraviolet radiations which are encountered in a fluorescent lamp.

For special applications, such as photosorting of agricultural products, there exists a need for discharge devices having an emission in the near infrared, such as a wavelength of 730–740 nm.

The phosphor $LiAl_5O_8$:Fe is reported in the Journal of the American Ceramic Society, Vol. 41, pg. 88 (March 1958), reference note 8 at page 89, wherein unpublished data is summarized and it is stated that this composition fluoresces when excited by 2,537 A.U. radiations. The same reference note, however, states that the composition $LiAlO_2$ with added iron does not fluoresce.

SUMMARY OF THE INVENTION

In accordance with the present invention, short wavelength ultraviolet radiations are converted into near infrared radiations, while minimizing the generation of any visible radiations, by irradiating with short wavelength ultraviolet radiations a phosphor consisting essentially of an $LiAlO_2$ matrix activated by from 0.001 to 0.02 gram atom of iron per gram mole of said matrix. Preferably, the phosphor is so irradiated by incorporating same as a coating onto the interior surface of an otherwise conventional fluorescent lamp. There is also provided the low-pressure fluorescent discharge device which incorporates such a phosphor as a component thereof.

The performance of the foregoing phosphor is enhanced by utilizing a fluxing technique for the preparation thereof wherein the phosphor is initially prepared by solid-state reaction of the phosphor constituents. Thereafter, the prepared material is refired with added lithium carbonate, with the lithium carbonate present in such amount that the total gram atoms of lithium in same are from 1 to 15 percent of the gram atoms of lithium in the phosphor matrix. After refiring, the flux is removed, such as by leaching in a dilute acidic solution. To insure that no flux remains, the phosphor preferably is again fired with a small amount of added aluminum oxide or aluminum compound which will convert to the oxide on firing. This converts any residual flux to lithium aluminate. This fluxing process increases the particle size of the phosphor and enhances it near infrared output.

BRIEF DESCRIPTION OF THE DRAWINGS

For a better understanding of the invention, reference may be had to the preferred embodiment, exemplary of the invention, shown in the accompanying drawings, in which.

DESCRIPTION OF THE PREFERRED EMBODIMENTS

Figure 1:
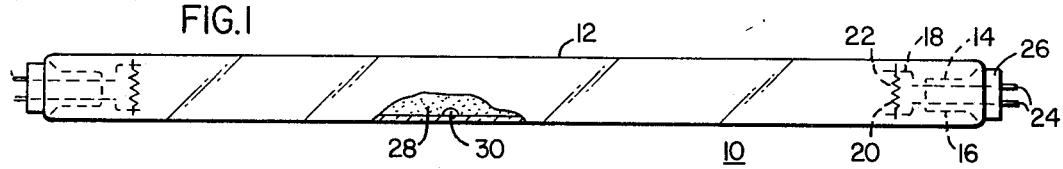
FIG. 1 is an elevational view, partly broken away, showing a low-pressure fluorescent discharge device which incorporates iron-activated lithium aluminate phosphor in accordance with the present invention.

With specific reference to the form of the invention illustrated in the drawings, the numeral 10 in FIG. 1 represents a 40W T12 type fluorescent lamp comprising a tubular, radiation-transmitting, vitreous envelope 12 which may be fabricated of soda-lime-silica glass or suitable filter glass, for example, having mounts 14 sealed into either end thereof, as is customary. Each mount comprises a vitreous portion 16 sealed to an end of the envelope with lead-in conductors 18 sealed therethrough and supporting at their inwardly extending extremities refractory metal coils 20, which are fabricated of tungsten, for example. Contained within the turns of the coils 20 is a filling of conventional electron-emitting material 22.

Electrical connection for the lead-in conductors 18, is normally effected by contact pins 24 which project from supporting base caps 26 at either end of the lamp. The envelope 12 has coated on its interior surface phosphor material 28, which in accordance with the present invention is iron-activated lithium aluminate, as will be explained in detail hereinafter. The envelope also contains a discharge-sustaining filling of argon or other inert, ionizable starting gas, at a pressure of about 4 torrs, for example, as well as a small charge of mercury 30. In the operation of such a lamp, when the electrodes are electrically connected to a source of predetermined energizing potential, via the contact pins 24, the device is operated with a predetermined power input to sustain between the electrodes a gas discharge which generates 254 nm ultraviolet radiations which excite the phosphor 28.

As a specific example for preparing the phosphor, 387.65 grams of aluminum hydroxide are mixed with 184.75 grams of lithium carbonate and 12.12 grams of hydrated ferric nitrate, $Fe(NO_3)_3 \cdot 9H_2O$, using a water-slurry technique. The mixture is dried, placed in a covered silica tray and slowly heated to 900°C, cooled, ground, and then fired at a temperature of 1250°C in an air atmosphere for 2 hours. The fired material is reground and fired again under similar conditions for a similar time. The fired material is then ground, screened through a number 325 mesh and thereafter is ready for use.

Figure 2:
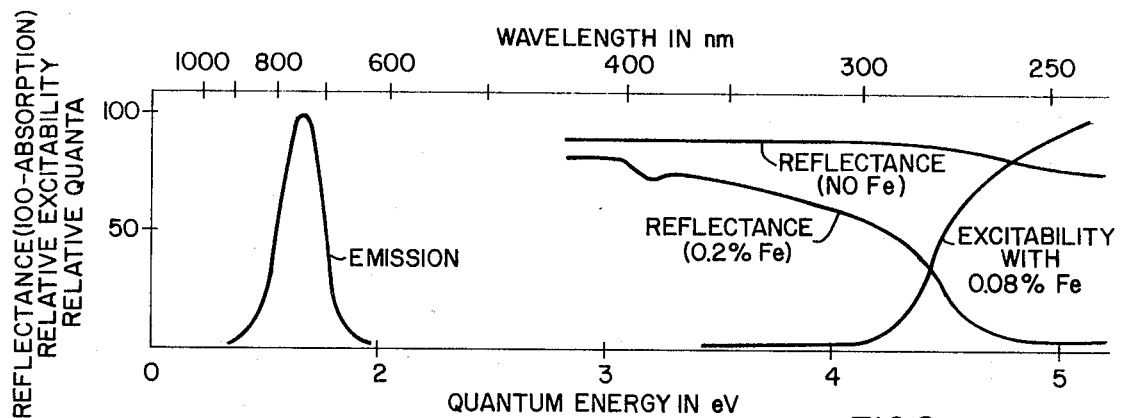
FIG. 2 is a graph showing the optical reflection, excitation, and emission spectrum for iron-activated lithium aluminate phosphor.

As shown in FIG. 2, wherein quantum energy in electron volts and wavelength in nanometers are plotted on the abscissa, the resulting phosphor material has an emission which peaks in the near infrared at approximately 740 nm, with very little emission in the visible. The phosphor is readily excited by the short wavelength ultraviolet radiations which are generated in the fluorescent lamp. Without the iron activator, the phosphor reflectance (100 minus absorption) approaches unity, but with the iron activator, the reflectance for 254 nm excitation is quite low. The excitation curve for the phosphor is also shown and the phosphor responds very well to shortwave ultraviolet excitation, such as is generated by a low-pressure positive-column mercury discharge.

For best performance, the phosphor, after preparation in the manner as specified hereinbefore, is additionally processed by fluxing with lithium carbonate. The amount of added carbonate is primarily limited by the tendency of increased amounts of lithium compound to react with the firing container. As a practical matter, the added lithium carbonate is thus limited to such amount that the gram atoms of lithium in the added fluxing compound do not exceed 15 percent of the gram atoms of lithium in the phosphor being fluxed. In order for the flux to be effective, it should be present in such amount that the gram atoms of lithium in the added fluxing compound are at least 1 percent of the gram atoms of lithium in the phosphor being processed. As a specific example, the foregoing prepared phosphor has added thereto 18.47 grams of lithium carbonate, and the mixture is fired at from about 1,200°C to 1,300°C for at least 1 hour. Preferably the phosphor is fired at 1,250°C in an air atmosphere in an alundum crucible for 2 hours. The fired material then has the lithium fluxing compound removed by leaching in a dilute acidic solution. As a specific example, the fired phosphor is leached for at least 5 minutes in a 10 percent acetic acid solution. The leached material is thereafter water rinsed, dried, and screened through a number 325 mesh. The concentration of the dilute acidic leaching solution is not critical and can be varied. Acids other than acetic can be used, but acetic is preferred because of its limited tendency to react with $LiAlO_2$.

Any residual flux will have a deleterious effect upon the phosphor and for optimum performance, the ratio of lithium to aluminum should be as close as possible to unity. If the ratio of lithium to aluminum exceeds unity, the phosphor tends to have poor maintenance of near-infrared emission under operating conditions. If the gram atom ratio of lithium to aluminum is less than unity, the phosphor has some tendency to emit in the 680 nm band, apparently due to some traces of $LiAl_5O_8$:Fe. To insure that all possible flux is removed, there can be added to the phosphor, after leaching and rinsing, a small amount of aluminum oxide or aluminum compound which will convert to the oxide on firing, and then firing the mixture at from about 1,200°C to 1,300°C for at least 1 hour to react the added aluminum compound with any excess flux which may remain. As a specific example, for the phosphor sample considered hereinbefore, after leaching and rinsing, the phosphor is mixed with 10 grams $Al(NO_3)_3 \cdot 9H_2O$ in solution, dried, and then fired at 1,250°C in an air atmosphere in a silica crucible for a period of 2 hours.

Figure 3:
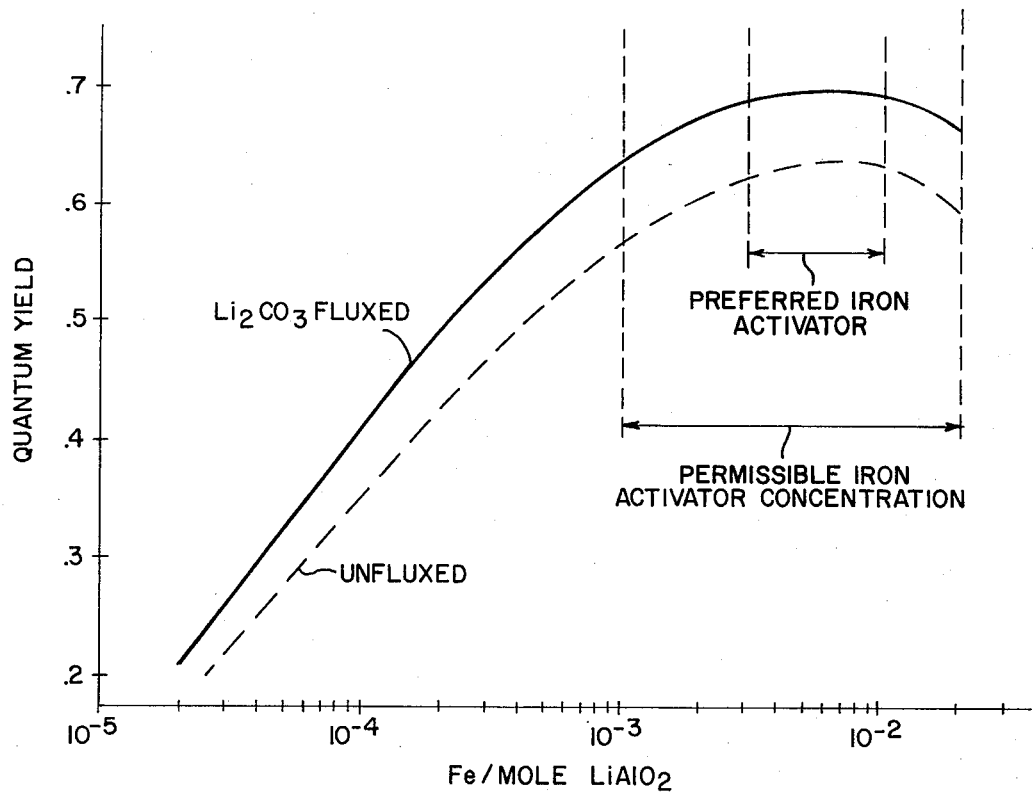
FIG. 3 is a graph of quantum yield versus iron activator concentration and also showing the increased yield obtained from phosphor prepared in accordance with the present fluxing procedure, as compared to an unfluxed material.

In FIG. 3 is plotted quantum yield vs. activator concentration, taken with respect to gram atoms of iron per mole of phosphor matrix. For reasonable performance, the iron should be present in amount of from 0.001 to 0.02 gram atom per mole of $LiAlO_2$ matrix and for best output, the iron should be present in amount of from 0.003 to 0.01 gram atom per mole of matrix. In FIG. 3 is also shown the beneficial effect of the foregoing fluxing procedure which appreciably increases the quantum yield of the phosphor.

Fluorescent lamps such as shown in FIG. 1 have excellent utility for special applications such as photosorting of agricultural products and for experimental plant-growth applications, wherein controlled amount of radiations in the near infrared have been found to be beneficial. Other possible applications for the present discharge device are infrared photography, and illumination of videophone subjects.

The operating appearance of the lamp is a dull teal blue, due to the combination of the limited blue radiations generated by the mercury discharge and the small amount of deep red radiations generated by the phosphor. If it is desired to eliminate the blue mercury discharge radiations, the envelope may also function as a filter, and such blue-light-absorbing, infrared-transmitting filters are well known.

We claim:

1. The method of converting short wavelength ultraviolet radiations into near infrared radiations while minimizing the generation of visible radiations, which method comprises, irradiating with short wavelength ultraviolet radiations a phosphor consisting essentially of an $LiAlO_2$ matrix activated by from 0.001 to 0.02 gram atom of iron per gram mole of said matrix to provide infra-red radiations having an emission peaked at approximately 740 n.m.

2. The method as specified in claim 1, wherein said iron activator is present in an amount of about 0.003 to 0.01 gram atom per gram mole of said matrix.

3. The method as specified in claim 1, wherein said short wavelength ultraviolet radiations are generated by a low-pressure positive-column mercury discharge contained within an elongated radiation-transmitting envelope, and said phosphor is carried as a layer on the interior surface of said envelope.

4. The method as specified in claim 3, wherein said iron activator is present in amount of about 0.003 to 0.01 gram atom per gram mole of said matrix.

5. A near-infrared-generating fluorescent discharge device comprising: a sealed elongated radiation-transmitting envelope, a discharge-sustaining filling comprising mercury and inert ionizable starting gas contained within said envelope, electrodes operatively positioned proximate the ends of said envelope and operable to sustain therebetween a low-pressure positive-column mercury discharge, and a phosphor carried as a layer on the interior surface of said envelope and consisting essentially of a $LiAlO_2$ matrix activated by from 0.001 to 0.02 gram atom of iron per gram mole of said matrix, and said discharge device having an infra-red emission which peaks at approximately 740 n.m.

6. The device as specified in claim 5, wherein said iron activator is present in amount of from 0.003 to 0.01 gram atom per gram mole of said matrix.

7. The method of enhancing the fluorescent response of near-infrared-emitting phosphor having a matrix consisting essentially of $LiAlO_2$ and activated by iron in amount of from 0.001 to 0.02 gram atom per gram mole of said matrix, which method comprises: thoroughly mixing lithium carbonate flux with the prepared finely divided phosphor, with the gram atoms of lithium in said lithium carbonate flux being from 1 to 15 percent of the gram atoms of lithium in the matrix of said mixed phosphor, firing the mixture at a temperature of from about 1,200°C to about 1,300°C for a period of at least about 1 hour, cooling the fired material, and thereafter leaching said fired material in a dilute acidic solution whereby the phosphor infra-red emission which peaks at approximately 740 n.m. is enhanced.

8. The method as specified in claim 7, wherein said phosphor after leaching has thoroughly mixed therewith a small amount of aluminum oxide or aluminum compound which will convert to the oxide on firing, and firing said mixture at from about 1,200°C to about 1,300°C for at least one hour to react the added aluminum compound with any excess flux which may remain in said phosphor.

* * * * *